March 12, 1940.  H. S. DALE  2,193,554
AIRCRAFT CONSTRUCTION
Filed May 3, 1939
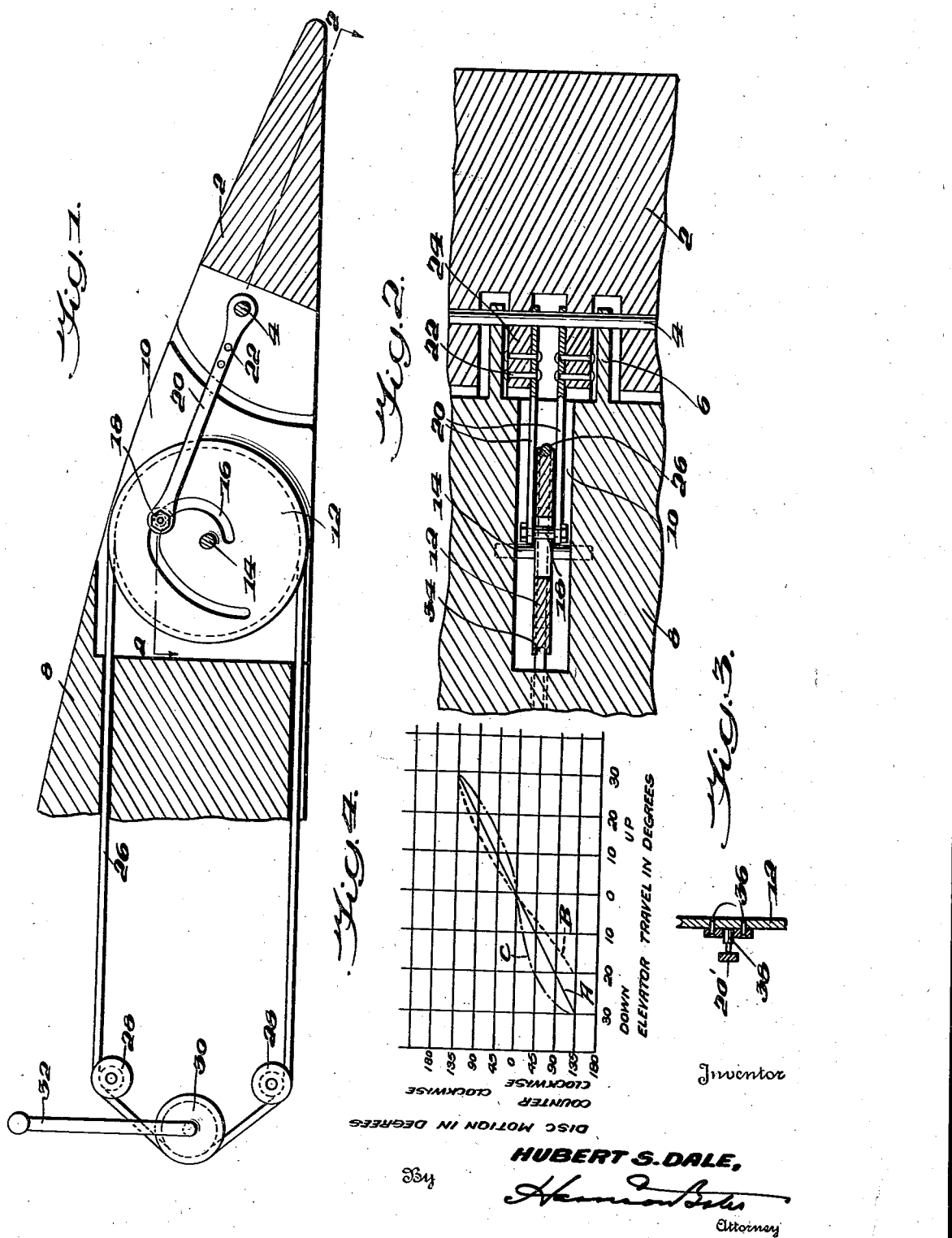
Inventor
HUBERT S. DALE,
By
Attorney Patented Mar. 12, 1940

2,193,554

UNITED STATES PATENT OFFICE 2,193,554

AIRCRAFT CONSTRUCTION

Hubert S. Dale, Middle River, Md., assignor to The Glenn L. Martin Company, Baltimore, Md.

Application May 3, 1939, Serial No. 271,433

2 Claims. (Cl. 244—83)

The invention relates to aircraft construction, and particularly to the control of aircraft surfaces.

The primary object of the invention is to provide a simple mechanism for the movement of a control surface, which is located adjacent the control surface and which can be arranged to be self-locking or irreversible to any desired degree. Heretofore, most aircraft controls have been either completely irreversible, or completely reversible; some have been irreversible in one position only, and reversible in all other positions. By the present invention, the control may be so arranged as to be reversible or irreversible throughout any desired portions of its movement, or the degree of reversibility, that is, the force required to be exerted on the control surface in order to cause a movement of the control mechanism, may be varied if desired for any part of the movement of the control mechanism.

Another object of the invention is to provide a control mechanism in which the force required for operation may be varied at will at different points of travel of the control device, so that the mechanical advantage or leverage may be made greatest where the loads are highest; thus the pilot will be enabled to operate the control by exerting an approximately equal force thereon throughout its movement.

Still another object of the invention is to provide a control mechanism which is simple and yet strong, and which is easily manufactured and repaired.

Further objects and advantages of the invention will appear more fully from the following description, particularly when taken in conjunction with the accompanying drawing which forms a part thereof.

In the drawing:

Fig. 1 shows in side elevation, with the air foil in section, one form of mechanism embodying my invention;

Fig. 2 is a cross section substantially on the line 2—2 of Fig. 1;

Fig. 3 shows in section a portion of a modified form of the invention; and

Fig. 4 is a diagram showing some possible curves of movement of the movable surface with variations in movement of the control member.

The invention is applied to a control surface 2 hinged at 4 on projections 6 extending from the rear of an air foil 8. This air foil may be any surface of the aircraft, but in the form shown is assumed to be a rear stabilizing surface, with the control surface 2 forming the elevator.

Mounted in a cut-out section or recess 10 in the rear edge of the air foil 8 is a disc 12 pivoted to turn around an axis 14. This disc has a spiral slot 16 of any suitable shape, which extends in the form shown substantially 300° around the disc. The slot 16 extends through the disc from one face to the other. Engaged in the slot 16 is a roller 18, which is rotatably mounted in the ends of two links or arms 20 lying on opposite sides of the disc 12. The other ends of links or arms 20 are mounted on the pivot 4 of the control surface 2. The links are made rigid with the control surface by rivets 22 or other suitable securing means which pass through the links and through portions 24 of the control surface 2.

It will be noted that axis 14 is located substantially in the circle described by movement of roller 18 about axis 4; or, in other words, pivot 14 and roller 18 are substantially equidistant from point 4. This makes the device irreversible whenever the curve is substantially normal at any point to the radius of the disc through such point.

The turning of the disc 12 is caused by a cable 26, which passes over rollers 28 to a sheave 30, around which several turns of the cable 26 are wound. Sheave 30 is controlled by a lever 32, by the pilot or another operator.

It is evident that upon the movement of the lever 32, cables 26 will cause the disc 12 to turn, and the spiral nature of slot 16 will cause the roller 18 to move towards and from the axis 14 of the disc. This will obviously cause a rocking of the links 20 around the axis 4, and since the control surface 2 is rigid with the links 20 this surface will likewise be turned.

It is evident that the cable 26 runs through the space between the two links 20, so that it cannot be displaced from the groove 34 in the peripheral surface of the disc 12 in which it runs.

By varying the shape of the spiral groove 16 it is possible to obtain many different effects. For example, the portions of the spiral may have different angular inclinations to the radii of the disc, or, in other words, the centers and radii of curvature of the spiral may be varied. In this way, any desired portion of the spiral may be made self-locking, or irreversible, by providing surfaces which are substantially normal to the disc radii; or may be made non-self-locking or reversible by forming the surfaces at considerable angles to the radii. The angle will determine the degree of self-locking obtained.

Fig. 4 shows various curves of movement which can be obtained according to the invention. The movement of the control surface may, as shown by the straight line A, be a linear function of the angular movement of the disc 12. Such a disc would be substantially reversible at all points, since irreversibility is obtained only where the curve in the chart approaches the horizontal. Another construction of the disc might give the curve B, shown in broken lines, in which the device becomes substantially irreversible at one end represented by the upper end of the curve. A further construction might result in the dot-and-dash curve C, which is substantially irreversible at the central portion, or in other words, when the control surface 2 is in aligned neutral position. The shape to be selected will be determined by the aerodynamic forces to be overcome and the other considerations, being preferably such that the curve will be flatter where the forces to be overcome are large or where irreversibility is desired.

The disc 12 need not be provided with a slot as shown in Fig. 1. Instead, as shown in Fig. 3 a groove may be formed in one face of the slot by securing on such face two suitably spiral strips 36, between which is engaged a roller 38 mounted on the end of a single link 20'.

While I have described herein some embodiments of my invention, I wish it to be understood that I do not intend to limit myself thereby except within the scope of the appended claims.

I claim:

1. In an aircraft, a fixed surface having a recess in its rear edge, a movable surface hinged to the trailing edge of said fixed surface, a member rigid with said movable surface, a disc pivoted within said recess to said fixed surface to turn about an axis parallel with the hinge axis of said movable surface, said disc being entirely within the confines of said fixed surface, said disc having a spiral track way therein, a roller on said member engageable in said track way, and means to turn said disc.

2. In an aircraft, a fixed surface having a recess in its rear edge, a movable surface hinged to the trailing edge of said fixed surface a member rigid with said movable surface, a disc pivoted within said recess to said fixed surface to turn about an axis parallel with the hinge axis of said movable surface, said disc being entirely within the confines of said fixed surface, said disc having a spiral track way therein, a roller engaged in said track way and a pair of links mounted on said control surface and rigidly connected thereto, said links extending on either side of said disc, said roller being mounted in said links, and means to turn said disc.

HUBERT S. DALE.